Figure 1:
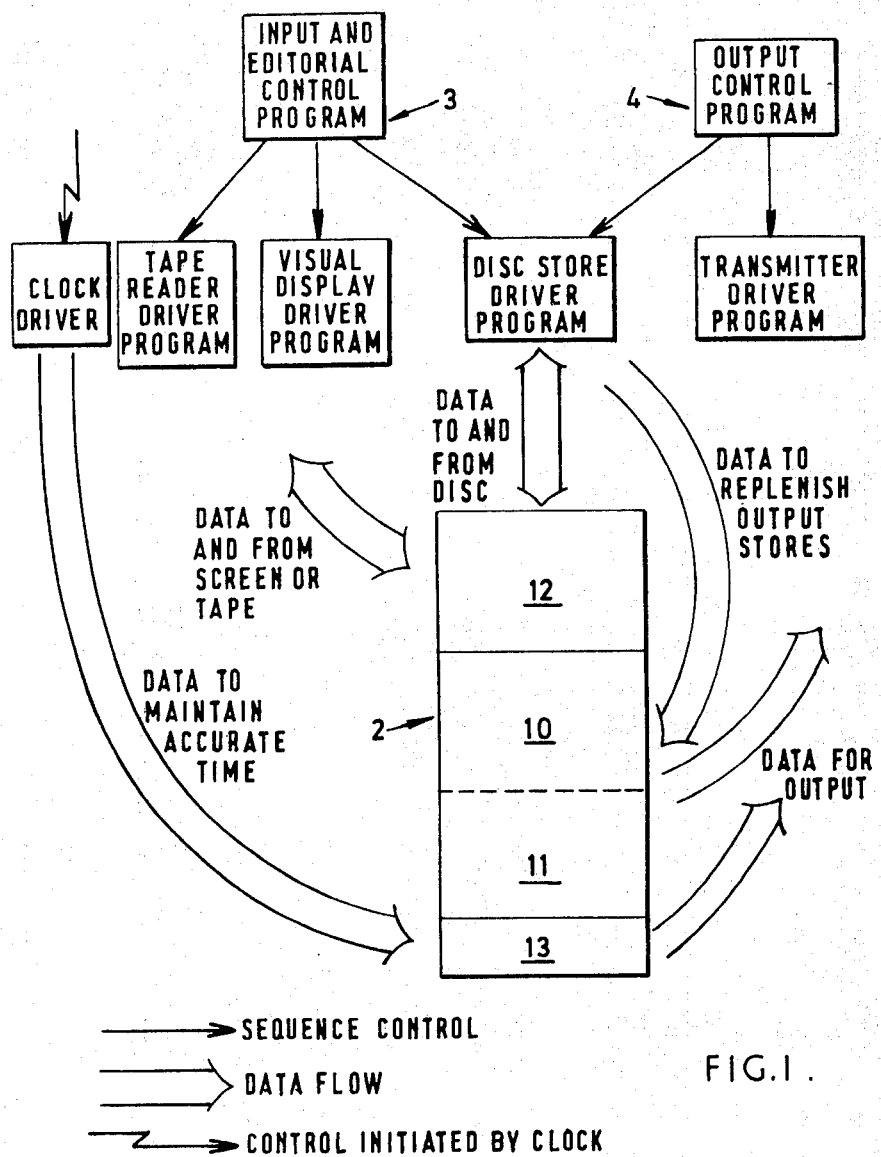

United States Patent [19]

Hutt et al.

[11] 3,996,583
[45] Dec. 7, 1976

[54] SYSTEM FOR PROCESSING DATA SIGNALS FOR INSERTION IN TELEVISION SIGNALS

[75] Inventors: Peter Richard Hutt, Richmond; Alan Ronald Blake, London; Günter Von Cavallar, South Wonston, near Winchester; Brian Neil Douglas, London; Philip John Dodds, Southampton, all of England

[73] Assignee: Independent Broadcasting Authority, London, England

[22] Filed: July 30, 1974

[21] Appl. No.: 493,109

[30] Foreign Application Priority Data

July 30, 1973 United Kingdom .............. 36207/73

[52] U.S. Cl. .......................... 340/324 AD; 178/30; 178/DIG. 6
[51] Int. Cl.² ........................................... G06F 3/14
[58] Field of Search ............... 340/324 AD; 178/15, 178/30, DIG. 6

[56] References Cited

UNITED STATES PATENTS 3,524,022 8/1970 Schoenthal .......................... 178/15
3,701,988 10/1972 Allaart ........................ 340/324 AD

*Primary Examiner*—Marshall M. Curtis
*Attorney, Agent, or Firm*—A. W. Breiner

[57] ABSTRACT

In any television transmission system there are periods during which the wide-band picture signals are absent. The invention provides a signal generator system for the transmission of digital information representing a series of pages of alphanumeric or graphical symbols piecewise during these periods. At least one peripheral generating device is provided for supplying digitized data to a main storage device (conveniently of the magnetic disc type) and transfer means is operable to read out portions of the data from the main storage device and store them temporarily in a second storage device. Discharge means is operable to discharge portions of the data from the second storage device at intervals to provide output signals for insertion in a television signal during periods as aforesaid.

21 Claims, 3 Drawing Figures

SYSTEM FOR PROCESSING DATA SIGNALS FOR INSERTION IN TELEVISION SIGNALS

The present invention relates to television systems and has an an object the provision of television systems for the presentation of visual displays in a novel and convenient manner.

In any television system, the transmission of the wide band video signals, which are to produce the actual picture elements on the screen of the receiver, is interrupted between the scanning periods for line synchronisation and field synchronisation purposes. Consequently, there are periods in which no video signals are being transmitted. An object of the present invention is to provide for the transmission of useful data during such periods.

Basically, data representable by standard graphical symbols such as alpha-numeric symbols can be transmitted via a restricted channel provided that the rate of transmission is restricted. There is a potential value in presenting the viewer with access to such data in the form of a series of pages from which he may select one page at a time for display on his screen. The periods unoccupied by video signals provide an adequate channel for the repeated transmission of a set of tens of pages each containing hundreds of symbols at a conveniently short page recurrence frequency. The present invention provides a system for the convenient generation of the signals required.

In accordance with the present invention, there is provided a signal generator system for the transmission of data for a series of pages which comprises a main storage device for the data in digital form, at least one peripheral generating device for supplying data to the main storage device, a second storage device, transfer means operable to read out portions of the data from the main storage device and temporarily store them in the second storage device, and discharge means operable to discharge portions of the data from the second storage device at intervals to provide output signals at an output for insertion during periods of a television signal which are unoccupied by video signals, preferably during the active line times of the individual lines of the field blanking intervals (hereinafter referred to as LTFB periods). It is preferred that the periods should be line times of the field blanking intervals, that is to say those which correspond with the times occupied by video signals on active picture lines. There are typically 25 videofree lines per field. Of these, it is considered that the maximum number which could be used for data provided by the signal generator of the invention, is about 20 lines. In practice, however, the use of only two adjacent lines gives an adequate rate of transmission of data and the use of only a very small number of lines is advantageous in that it does not impair the normal functioning of current domestic receivers.

The present invention includes within its scope generator systems arranged to provide the output signals for insertion during periods other than LTFB periods, e.g. in sync periods or porch periods.

A convenient form of main store, in the present state of the art, is a magnetic store. A magnetic disc store is especially attractive because it provides good accessibility to large quantities of stored data. In general, a store of the random access type is preferable to a purely cyclically accessible store, and a magnetic disc store provides a good economic compromise in the present state of the art.

For most applications, the peripheral generating device is advantageously a character generator of the alpha-numeric type, e.g. a generator of the keyboard type or, less preferably, a generator operating from a previously prepared input such as a punched tape. Two or more peripheral generating devices, which may be of the same type or different types may be provided if desired. A potentially useful alternative to, or auxiliary to, a generator of the alpha-numeric type is a generator operable to produce symbols of a kind which yield a diagram when assembled together to form a page or a part of a page.

Of especial interest for this last purpose are symbols derived by filling the positions of a matrix in the various possible combinations. A 3 × 2 matrix, i.e. a matrix having three horizontal rows with two positions in each, gives 62 possible graphical symbols derived by inserting from 1 to 5 dots in various distributions in addition to the possibilities of a completely full and a completely empty matrix, which are to be regarded as two further graphical symbols. Using symbols of this type arranged like alpha-numeric symbols, on a series of lines, still pictorial matter can be formed. Compared with pictorial matter taken from video signals in the normal way, such matter lacks detail but is adequate for suitable subjects.

In a preferred form of the system, there are provided an intermediate store for storing data supplied by the peripheral generating device or devices and transfer means operable to transfer the data from the intermediate store to the main store. This arrangement avoids feeding data direct to the main store as it is generated. Moreover, the system may incorporate at least one exhibiting device for exhibiting the data in the main store via the intermediate store. Arrangements for reading out a page or other part of the data from the main store and writing it into the intermediate store may be provided so that it may be exhibited without transferring it to second storage device.

Conveniently, the system has at least two types of exhibiting devices as aforesaid, one type providing a temporary visual display and the other type providing a print-out or other permanent record.

By arranging that the peripheral generating device, or one of them, can be used for up-dating or correcting a displayed page, the editing of the data may be accomplished in a very convenient manner.

In order that transmitted data shall be assembled correctly, and reliably, for display on viewers' receivers, the system of the invention advantageously has an addressing device for adding address codes to the said portions of data, preferably before they leave the second storage device. In a preferred arrangement, the second storage device has an output buffer area and the addressing device is connected with the buffer area, the arrangement being such that said portions are discharged from the buffer area together with the corresponding address codes.

The output from the system is, for substantially all practical cases, a binary output. Since the number of possible symbols is limited, even when the 64 states of a 3 × 2 matrix are included, the number of digits required to identify a symbol is reasonably small.

Satisfactory results under good conditions of propagation such as are normally found within the main service area of a television broadcast transmitter, are obtainable by transmitting the binary characters in the simple NRZ (non return to zero) form where the zero- and one-characters are simply represented by two different signal levels, one of which is usually zero. For improved reliability under difficult conditions, e.g. in fringe areas where noise is significant, the output may be connected with a bi-phase data generator for converting the output to a bi-phase form, wherein each binary character is represented by two signal levels, for transmission. This improved reliability is however accompanied by a reduction in the available rate of transmission of characters.

Using bi-phase transmission, good presentation of data on the viewer's screen tends to require lines of characters containing more characters than can conveniently be transmitted during a single LTFB period. To meet this difficulty, the system may be arranged for use with data for display in lines of alpha-numeric characters and so programmed that the discharged portions of data correspond with segments of said lines so that a line of characters corresponds with a series of segments for insertion during different LTFB periods of the television signal. A convenient number of segments per line of data is four.

As will be appreciated, the speed of reading-out the main store can be much lower than the speed of discharging the portions of data from the second storage device. It has been found to be advantageous to arrange that the second storage device has sufficient storage capacity to hold at least two pages of data, and the transfer means is operable to read out a page of data from the main store and store it in the second storage device whilst data from a previous page is being discharged to provide the output signals. This arrangement gives very reliable results, ensuring that there is a supply of data ready for transmission in spite of any reasonably normal irregularities of timing. The operation of reading-out the main store can be effected quite independently of the timing of the television signal with which the data is to be broadcast.

In bi-phase signals, each 1-bit is represented by a 1-level followed by a zero level and each zero bit is represented by a zero-level followed by a 1-level or vice versa. It is characteristic of the bi-phase signals that with any series of binary bits (each of which involves a transition from one level to another even though it may be identical with the preceding bit) the maximum interval between the transitions can never be longer than the time occupied by one bit. Certain transmission errors are therefore recognisable as such.

Advantage may be taken of the said characteristic by transmitting, with the portions of data, a code in which there is at least one interval between transitions which is greater than the said maximum interval. The presence of the code is at least strongly indicative that the portions of data are genuine, and not for example spurious data generated by random interference or derived accidentally from some other data channel or from the picture portion of a television signal.

To facilitate the design of receiving equipment, the system of the invention preferably has a start code generator arranged to provide a start code for insertion in the said line periods before the said output signals. Where bi-phase signals are used, a start code generator operable to generate a start code having at least one interval as aforesaid is preferred.

For further advantage, the system may have a run-in signal for insertion in said line periods before the start code. The run-in signal may be applied to bring a clock circuit at a receiver to the appropriate frequency and phase.

A receiver for the data can be so designed that the data does not necessarily have to be received on the same television channel as that to which the receiver is tuned for the normal reception and display of video signals. Having a run-in signal associated with the portions of data greatly facilitates reception under these conditions, as well as making reception more reliable when only a single channel is involved.

In a practical system it is convenient to have the run-in signal generator and the start code generator arranged to add their signals to the portions of data just before these portions are transmitted, i.e. just in advance of an inserter arranged to insert the data during the LTFB or other periods unoccupied by video signals. The addition may take place after the portions have passed preferably with their address codes, from the second storage device via an interface. Thus, the second storage device may transmit data to the interface on receipt of appropriate command pulses originated by the inserter.

Figure 2:
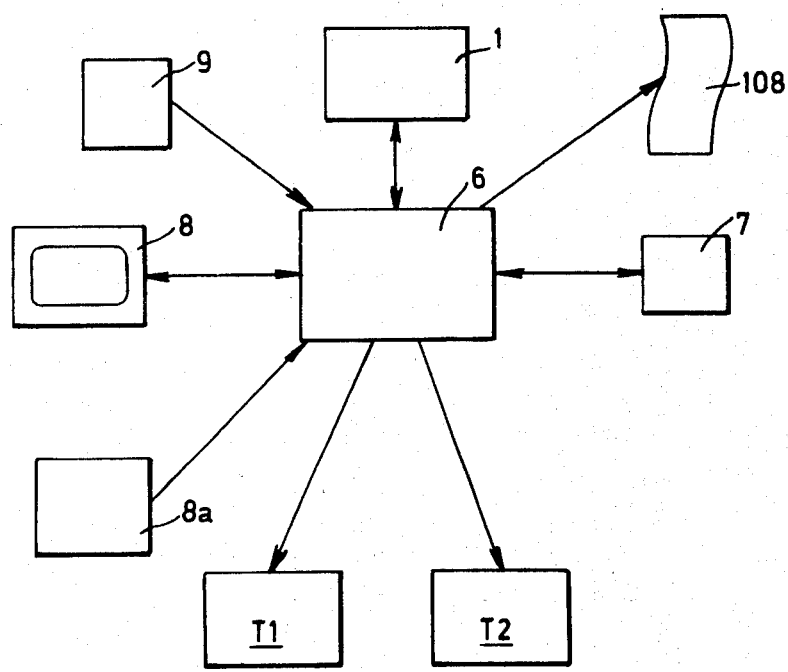
Figure 3:
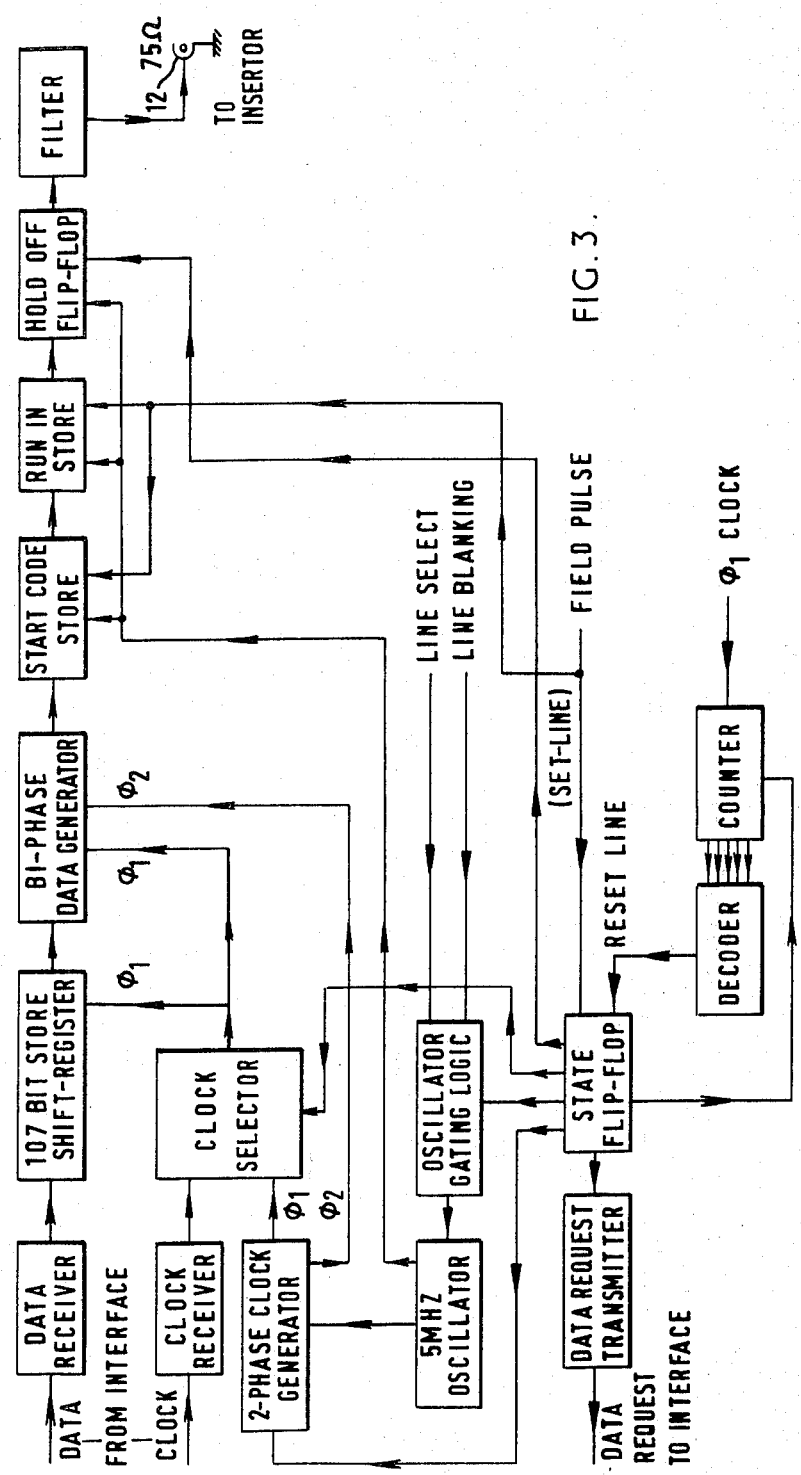

The following description, in which reference is made to the accompanying drawings, is given in order to illustrate the invention. In the drawings:

FIGS. 1 and 2 show a method of handling information within equipment to produce and edit data signals with address codes, and FIG. 3 shows a transmission circuit for processing the signals produced by the system of FIG. 1 prior to insertion in a television signal to be distributed by radiation or otherwise.

The apparatus to be described provides digital signals for bi-phase transmission at a bit rate of 2.5 M bit per second. In each signal a run-in of 8 identical bits, which is sufficient to synchronise a receiver at a reasonable signal to noise ratio, is followed by a unique start code of 8 bits. Then follows a 5-bit line number, a page of number of 6 bits, a strip number of 5 bits, a segment number of 3 bits and a set of 8 bits, all zero, which represent unused time or may be used for various commands for controlling the receiver. The last bit of this 8-bit set acts as a cleaning signal if it has a value of unity. This sequence is followed by ten 8-bit words each of which defines an alpha-numeric character. A maximum of 7 bits is required to define a character. Therefore, one of the 8-bit words can be used for control purposes if desired. A blank is, of course, considered to be a character.

Thus, ten character codes are transmitted per signal. The intended display has 40 characters per strip. Each strip therefore requires four signals, correctly addressed. A complete page consists of 22 strips (88 segments) containing up to 880 characters. Using only a single line of the field blanking period per field, conveniently line 16 in the 625 line system used in the United Kingdom, a page can be transmitted in about 1.5 seconds. A set of 50 pages can be transmitted repeatedly in a time of less than two minutes per complete cycle. This number of pages enables information on a usefully large number of topics (e.g. general and regional weather forecasts, stock market information, currency exchange rates, sports results and theatre information) to be made available to the viewer. The cycle time may be halved by using two lines (e.g. two adjacent lines) per field blanking period.

With apparatus for providing digital signals for NRZ transmission, 40 character codes can be transmitted per signal. It is not necessary to divide the strips into segments and only one signal is required per strip.

FIGS. 1 and 2 show the general arrangement of a signal generator system for producing output signals at intervals as required, these signals consisting of segments each of ten characters. A main storage device 1 (FIG. 2) in the form of a magnetic disc store is linked with a second storage device 2 (FIG 1) of the rapid access core store type. An input and editorial subsystem 3, an output subsystem 4 and a clock input 5 are provided as shown generally. The program control, data flow and the control initiated by the computer clock are as shown — see the KEY which forms part of FIG. 1.

The storage device 2 actually part of a Honeywell DDP516 computer which is programed by soft-ware to simulate the input and editorial subsystem 3 and the output subsystem 4. Other commercially available computers may, of course, be employed. The configuration of the hardware is shown in FIG. 2, and the form of the soft-ware is shown in FIG. 1. In FIG. 2, the central processor and memory 6 is constituted by the programed computer of FIG. 1. Linked thereto are the disc store 1, a tape reader 7 for feeding in characters from punched tape, a keyboard 8a for feeding in characters direct, a visual display unit 8 for displaying a page of data when required, a printer 108 for producing a printed record, a digital clock 9 and data transmitters 10 and 11, shown as $T_1$ and $T_2$, respectively, for two adjacent lines of a field.

The output subsystem 4 recalls pages of data from the disc store 1 and each page, after being sub-divided into segments, is output one segment at a time. One segment is output on receipt of each interrupt which signals a requirement for data for transmission. The system shown uses 2 television lines per field, but the software is so designed as to require only a simple modificaion to allow an extension to more lines per field, without affecting the overall design philosophy. A reduction to a lower number of lines per field requires no software inserter for that line. The system will then continue to output on the remaining lines without loss of data but with an appropriate increase in the time taken to output a page. The system will recommence output on a line when the inserter for that line is switched on again.

The output subsystem 4 is effectively divided to provide two principal functions; one for outputting data for transmission and one for retrieving from the main storage system the next page to be output. Although these functions are not completely independent they are arranged so that a queue of pages ready for output can always be maintained while another page is already being output. This is done so that no time is lost between output of pages, as might happen if pages were not called from the storage device until they were needed for output. At present only one page is kept in this way in addition to the one being output although the principle, which involves realtime interrupts, can easily be extended to maintain a larger queue should it ever be required. The second storage is divided into as many page-size areas as is necessary to contain the queue plus the page currently being transmitted (10 and 11 in FIG. 1 for queue of 1).

In addition to the normal page text, a 24 hour digital clock is displayed on each page giving a reading in hours, minutes, and seconds. The time is read from a clock and written directly into a section 13 of the storage device 2, by a program which arranges for the output of a segment containing the current time. The segment is addressed so that the receiving equipment will display it whatever page has been selected. Thus the time need only be output once for all pages, and since it is output at least once every second, the effect at the receiver is that of an accurate continually changing digital clock.

Subtitling captions can be arranged to be transmitted on the system. In conjunction with special editorial equipment (and possibly personnel) these captions could be provided as say two rows of characters at the bottom of the screen as a commentary for deaf viewers, and/or minority language audiences. Such captions may be transmitted frequently and interspersed between the other pages of data.

The editorial sub-system 3 gives access to the pages of data by means of commands input on a typewriter-like keyboard. Various commands are available to an operator who wishes to exert some control over the system by means of editing existing pages or inserting new pages of text into the system.

For editing purposes, a page of text can be taken from the disc store, stored in a section 12 of the storage device 2 and read out for display on the visual display unit, and can then be edited by inserting, removing or replacing characters using the keyboard, and can then be written back into the section 12 of the second store.

New pages can be typed onto the screen using keyboard 8a and then inserted into the system to completely replace an existing page or to fill an empty page. Redundant pages can also be erased in this way. Text can also be prepared on punched paper tape and read into the system through a paper tape reader 7.

The commands available also allow elementary control of the output sub-system in that an operator at the keyboard can cause the output to be started, stopped or channelled from ORACLE to a printing device, thus producing a hard copy of all the pages in the system for administrative purposes. The ability to switch the output subsystem on or off while still running the editorial subsystem means that text can be edited either outside or within the hours during which it is transmitted.

Without altering the physical structure of the system, other commands may be added to give greater flexibility in the editing of pages to facilitate, for example, the exchange of the contents of two or more pages, or a page rolling facility for types of pages where latest information is more important than earlier information.

In addition extra input devices enabling the input or editing of graphical displays may be incorporated. Graphical displays of limited detail may be built up of characters designed for the purpose.

To reduce the likelihood of text, having been edited on the display screen, being then written back onto the wrong page, thus overwriting a wanted page, by the editor accidentally typing the wrong number, elementary integrity procedures are used. These do, of course, allow him to write text to a different page if that is what he wants to do.

If a page is only partly filled, arrangement may be made so that, instead of reading-out the parts of the page consisting only of blanks from the storage device 2, only segments containing non-space characters are read out; blank segments are not transmitted. Reading-out the next page will thus begin early in response to an appropriate instruction. The cycle time for the complete set of pages is accordingly reduced. Owing to the address code being attached to each segment, the received display is not affected by this transmission economy.

The output from the apparatus of FIGS. 1 and 2 is fed via an interface to the transmission circuit of FIG. 3 which provides an output on a 75 ohm cable 12 for an inserter by which the output is inserted in the field blanking intervals of the required line or lines of a television signal to be distributed by radiation or otherwise. Line select pulses are provided by the inserter. The interface and the transmission circuit both have data storage capacity. Together with the data storage capacity of the second storage device 2 they give the system as a whole ample storage capacity to compensate for lack of synchronisation of its parts. A system depending upon the immediate availability to a television transmitter of data from the second storage device 2 (and especially if the device 2 were arranged to hold only one page of data) would be unreliable under actual service conditions.

The operation of the transmission circuit of FIG. 3 is as follows:

A field pulse derived in a sync separator responsive to the television signal sets the STATE FLIP-FLOP into the transmit state and loads the START CODE and RUN IN into the store (i.e. shift register). The transmit state of the STATE FLIP-FLOP primes the OSCILLATOR GATING LOGIC, instructs the CLOCK SELECTOR to select the $\phi_1$ CLOCK and takes the clear off the 2PHASE CLOCK GENERATOR, BIT COUNTER and HOLD OFF FLIP-FLOP.

The circuit then waits until it receives a line select and a line blanking pulse derived in the inserter and sync separator respectively. The parts of the two pulses which coincide with each other (i.e. the length of the line blanking pulse) enables the 5 MHz OSCILLATOR via the OSCILLATOR GATING LOGIC.

The $\phi_1$ CLOCK PULSES are counted in the COUNTER and after 124 $\phi_1$ CLOCK pulses have occurred (i.e. all the data has been shifted out) a RESET PULSE is produced by the DECODER to reset the STATE FLIP-FLOP into its DATA RECEIVE STATE. The transition from TRANSMIT to RECEIVE STATE is transmitted to the INTERFACE as a request for new data.

The DATA RECEIVE STATE also applies a RESET to the COUNTER, 2-PHASE CLOCK GENERATOR and HOLD OFF FLIP-FLOP and instructs the CLOCK SELECTOR to select the external clock (i.e. clock supplied by the interface to the data transmitter).

The interface replies to the request with the transmission of new data. This data is clocked into the 107 BIT STORE SHIFT REGISTER by the clock supplied by the interface via the CLOCK RECEIVER and CLOCK SELECTOR.

The circuit then awaits a new field pulse to repeat the cycle as described before.

Use of received signals from a system according to the present invention involves selecting the parts of the signals belonging to the required page, applying them to a character generator and displaying the generated characters at positions indicated by the accompanying address information.

It will be understood that the detailed description of specific apparatus given herein are provided by way of illustration only, and that various departures from that apparatus may be made without departing from the ambit of the invention.

We claim:

1. A signal processing system for the compilation and processing of a supply of data signals representing the data for a set of pages of data each for display, separately from the other pages, upon television receiver screens, to provide output signals for insertion in a transmitted television signal during periods of the transmitted television signal which are unoccupied by video signals, said system comprising a main store for storing the supply of data signals in digitized form, at least one peripheral data generating device for supplying data signals to the main store, a second store having a data storage capacity which is small compared with the storage capacity of the main store, transfer means operable to read out portions of the data signals in digitized form from the main store in a sequence for temporary storage of said portions in the second store, an output, discharge means operable to clock out the portions of the data from the second store and feed them to the output in series digital form at a rate and at times such that the discharged signals in said series digital form can be accommodated in said television signal during said periods, each said portion representing a part of one of said pages, said sequence being such that the supply of data signals representing the data for the set of pages is transferred to the second store in a repeated cycle, said second store and said discharge means cooperating in order that each portion is fed to the output once only per cycle and means at the output for also providing a clock run-in signal and a start code signal for accommodation in said television signal during said periods and before each said portion.

2. A system according to claim 1 in which the main store is a magnetic store.

3. A system according to claim 2 in which the main store is a magnetic disc store.

4. A system according to claim 1 having an intermediate store for storing data supplied by the peripheral generating device and transfer means operable to transfer the data from the intermediate store to the main store.

5. A system according to claim 4 having at least one exhibiting device for exhibiting data in the main store via the intermediate store.

6. A system according to claim 4 having two of said exhibiting devices, one of them providing a temporary visual display and the other of them providing a print-out or other permanent record.

7. A system according to claim 1 in which the second storage device has an addressing device for adding address codes to said portions.

8. A system according to claim 7 in which the second storage device has an output buffer area and the addressing device is connected with the buffer area, the arrangement being such that said portions are discharged from the buffer area togeher with the corresponding address codes.

9. A system according to claim 1 having, as a peripheral generating device, a character generator of the alpha-numeric type.

10. A system according to claim 1 in which the output has a bi-phase data generator for converting the output to a bi-phase form, wherein each binary character is represented by two signal levels for transmission.

11. A system according to claim 1 having a start code generator arranged to provide a start code for insertion in said television signals during the said periods before the said time spaced portions.

12. A system according to claim 11, having a run-in signal generator for generating a regularly repetitive run-in signal for insertion in said television signals before the start code.

13. A system according to claim 1 in which the said periods are active line times of the individual lines of the field blanking intervals of the television signal.

14. A system according to claim 1 having, as a peripheral generating device, a keyboard-operated alpha-numeric character generator.

15. A method for the compilation and processing of data for a series of pages of characters and preparing the compiled data for transmission which comprises generating the data for said pages using at least one peripheral generating device, compiling the generated data by transferring it to a main store, reading out portions of the compiled data from the main store at a first rate and temporarily storing said data in a second store, periodically discharging the portions from the second store at a second rate and inserting said portions, in series digital form, in a television signal during regularly recurrent periods of said signal which are free from video signals, said second rate being greater than said first rate and being such that the portions, when inserted in the television signal in series digital form, have a bit rate requiring a transmission band width comparable with the transmission band width required for the video signals of the television signal and the reading out of the portions of the compiled data from the main store being performed in a cyclic manner such that the data for the whole series of pages is inserted in the television signal in a sequence.

16. A method according to claim 15 in which the data is transferred to the main store via an intermediate store.

17. A method according to claim 15 in which the data generated by the peripheral generating device is digitized alpha-numeric data.

18. A method according to claim 15 in which each said portion is inserted in said signal together with an address code therefor.

19. A method according to claim 15 in which, during each one of said regularly recurrent periods of said signal, a said portion is inserted in said signal during a later part of said period and an address code for said portion is inserted in said signal during an earlier part of said period.

20. A method according to claim 15 in which, during each one of said regularly recurrent periods of said signal, there is inserted in said signal first a run-in signal and then a data signal, said data signal including one of said portions and an address code for said portion.

21. A method according to claim 15 in which the reading out of the portions of the compiled data from the main store is performed in a cyclic manner such that the whole of the data for any one of the pages is inserted in the signal over a period of time which is uninterrupted by the insertion of the data for others of the pages.

* * * * *